Patented Sept. 6, 1938

2,129,517

UNITED STATES PATENT OFFICE

2,129,517

ADHESIVE FOR INSECTICIDES AND A PROCESS FOR MAKING SAME

Lyle D. Goodhue, Berwyn, Md., dedicated to the free use of the People of the United States of America No Drawing. Application January 10, 1938, Serial No. 184,251

1 Claim. (Cl. 167—42)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People of the United States to take effect on the granting of a patent to me.

This application is in part a continuation of the one filed by me, Serial No. 42,247, filed September 26, 1935.

This invention relates to an adhesive used preferably in emulsified form. An object of my invention is to provide an adhesive which can be used with a large number of insecticides including powdered derris root, powdered cube root, powdered pyrethrum flowers, calcium and lead arsenate, Bordeaux mixture, Paris green, powdered sulfur or other powdered water-insoluble insecticides, fungicides or bactericides. Another object of my invention is to produce an adhesive that is not injurious to plant foliage at the most tender stages during the growing season. Another object is to provide an adhesive which is non-toxic to man and animals.

And still another very important object of my invention is to provide an adhesive which does not decompose or accelerate the decomposition of the active insecticidal ingredients in ground derris and cube root. The toxic properties in these insecticides are sensitive to the action of sunlight, and if not protected by the fibrous cellular part they soon decompose and become inactive. Therefore an object of my invention is to provide an adhesive in which these active ingredients are insoluble so that no extraction can occur which will cause decomposition by exposing the insecticide to the sunlight.

Many materials have been proposed for use with powdered insecticides and fungicides in order to make them adhere better to foliage on which they may be sprayed or dusted. Among these materials there may be mentioned gelatin, glue, calicum caseinate, gums, linseed oil, fish oil, and other saturated and unsaturated oils of vegetable or animal origin. All of these materials have certain disadvantages. I have found that a superior adhesive that can be safely applied to growing vegetation, which is non-poisonous to man and animals, which is compatible with all agricultural insecticides and fungicides and which does not decompose or accelerate the decomposition of the active ingredients of ground derris and cube root may be prepared from a naval stores product known to the trade as "Rosin residue" better named, and referred to hereafter as "pine oil foots." The sticky material is best used as an adhesive for agricultural poisons in emulsified form.

My material is prepared by steam distillation and solvent extraction of pulverized pine wood. The process is described fully by Irvine W. Humphrey in an article entitled "Extraction of terpene chemicals from waste pine wood" which appeared in the Transactions of the Institute of Chemical Engineers, vol. 9, pages 40–45, 1931. An outline of the process is as follows: Waste pine wood, stumps, logs, etc., are finely shredded and steam distilled. This process removes all of the terpentine and a part of the pine oil. The wood is then dried and extracted with a suitable petroleum fraction. This second process removes the rosin and the remainder of the pine oil which is now in solution in the solvent. In order to recover these products the solvent is removed in a two-stage film trap evaporation process. The rosin is left behind but the pine oil, polymerized terpenes and other less volatile products distill over. Also a small amount of rosin and other partially nonvolatile products are carried over in the spray and are therefore included in the mixture. This solvent and the pine oil are separated in a fractionating column, the solvent coming over first and the pine oil next. All the material which does not distill over and remains as "foots" in this fractionating process, taken as a whole, is known to the trade as "rosin residue" or "pine oil foots". The material is comprised principally of polymerized terpenes of high molecular weight, some material partially decomposed by heat and a small amount of rosin carried over by the spray from the film trap evaporators.

At the time the above article was published rosin residue was a waste product and of no importance and therefore was not mentioned although the complete process for its preparation and isolation was given. In the flow sheet, Fig. 3, on page 40 of his article an arrow drawn down from the step labeled "Crude pine oil" pointing to "Pine oil foots" would clearly indicate the step in the process where my material is isolated. A flow sheet published by the Hercules Powder Company clearly indicates the step.

My material is a sticky, tarry, substance having a pleasant terpene-like odor. There are various types of pine oil foots depending on how far the distillation process in the removal of solvent and pine oil is carried. The preferred type for my use as an adhesive for insecticides has the following specifications:

| | |
|---|---|
| Melting point____Degrees centigrade__ | 30 |
| Acid number_____ | 50-75 |
| Volatile with steam at 230° C_Percent__ | 25-35 |
| Saybolt viscosity at 100° C___Section__ | 100-200 |
| Specific gravity at 25° C_____ | 1.00-1.03 |
| Saponification number _____ | 85-90 |
| Unsaponifiable_____Percent__ | 50-60 |
| Petroleum ether soluble_____Percent__ | 3-5 |

Best results are obtained as an adhesive for insecticides applied as a spray when my material is used in the form of an emulsion. Many emulsifiers can be used but the preferred one is ammonium caseinate containing an excess of ammonia. This emulsion may be prepared as follows: to about 45 pounds of water heated to a temperature between 40 and 50° C. add 12 ounces of ammonium hydroxide sp. gr. 0.90. Then four pounds of granular casein are sifted in with rapid stirring so that no lumps are formed. As soon as the casein is completely dispersed add fifty pounds of pine oil foots with violent agitation. The amount of water in the above formula can be varied from 30 to 60 lbs. depending on the concentration desired. The amount of casein should not be less than two lbs. or more than six, for every fifty pounds of pine oil foots, while the amount of ammonium hydroxide is varied in proportion to the casein.

My material was first tested as an adhesive for derris. The method of testing is fully described in my publication entitled "Stickers for derris applied as an insecticidal spray" by Lyle D. Goodhue and Walter E. Fleming, Jour. Econ. Entomology 29 (3) 580-83 (1936). From 85 to 95 percent of the derris was retained on bean foliage by this adhesive after a washing test equal to 2.5 inches of rain in a period of 5 minutes.

Many subsequent tests have been made using pine oil foots as an adhesive for derris applied to the foliage of apple and peach trees. No other material tested up to this time has proven as efficient as this adhesive for derris. No other combination has given better control of the Japanese beetle.

This material is non-injurious to foliage. During this testing period of two years where orchards, truck crops and shade trees of many kinds were sprayed with pine oil foots no foliage injury has been encountered.

Furthermore, this material has the advantage over all other known adhesives in that it will not accelerate the decomposition of the active insecticidal ingredients in derris and cube. Extensive laboratory tests were made to prove this contention. Powdered derris or cube was suspended in water with the adhesive to be tested and sprayed on glass plates. These plates were exposed to sunlight and after a suitable exposure the rotenone and deguelin remaining was determined by chemical analysis. (Gross and Smith, Jour. Assoc. Official Agricultural Chemist. 17 336-9 (1934). The results by this method have previously been shown to parallel the results by toxicity tests on insects. Derris or cube decomposed very rapidly when an adhesive such as fish oil (either raw or blown), linseed oil, Chinawood oil, petroleum oil, latex, sodium silicate and many other materials were used as adhesives. When pine oil foots were used no acceleration over the normal rate of the decomposition occurred and at times considerable protection against light was noted.

My material has been tested with many other insecticides that are applied in spray form. These include lead arsenate, calcium arsenate, sulfur, Bordeaux mixture, cryolite, and others with equally good results with respect to adhesion. No effect on any insecticide has been observed in any of these tests.

My material has the advantage over other rosin like or naval stores materials similar to or made from rosin because it is inert and can be obtained with a very low acid number. For example, if rosin or cracked rosin were used with calcium arsenate, calcium would combine with the acid groups with the results that water-soluble arsenic would be liberated and severe foliage injury would result. The same would be true with lead arsenate or other arsenical insecticides.

Also my material has been definitely proven to be non-injurious to foliage while other tacky resins, such as phenol-formaldehyde resins are known to be injurious due to the presence of small amount of the uncombined raw materials. Cracked rosin also contains phenolic compounds which are injurious to foliage. In fact, it is very difficult to find a resin with the desirable adhesive properties without undesirable chemicals which cause foliage injure directly or which react to give chemicals which cause foliage injury. My material described above and known to the trade as rosin residue, or pine oil foots, is ideal in every respect.

Having thus described my invention, what I claim for Letters Patent is:

An adhesive for plant spray materials which is non-injurious to plant foliage comprising a substance remaining in the fractionating column after the removal of solvent and pine oil in the steam and solvent process for the production of naval store products from pine wood.

LYLE D. GOODHUE.